(12) United States Patent
Kasuga et al.

(10) Patent No.: US 9,132,712 B2
(45) Date of Patent: Sep. 15, 2015

(54) VEHICLE HEIGHT ADJUSTING DEVICE

(71) Applicant: SHOWA CORPORATION, Gyoda (JP)

(72) Inventors: Takahiro Kasuga, Haga-gun (JP);
Fumiaki Ishikawa, Haga-gun (JP);
Shunya Senda, Haga-gun (JP)

(73) Assignee: SHOWA CORPORATION, Gyoda, Saitama (JP)

( * ) Notice: Subject to any disclaimer, the term of this patent is extended or adjusted under 35 U.S.C. 154(b) by 133 days.

(21) Appl. No.: 13/800,964

(22) Filed: Mar. 13, 2013

(65) Prior Publication Data
US 2014/0088829 A1 Mar. 27, 2014

(30) Foreign Application Priority Data
Sep. 24, 2012 (JP) ................. 2012-209767

(51) Int. Cl.
*B60G 17/019* (2006.01)
*B60G 17/015* (2006.01)
*B60G 17/017* (2006.01)
*B60G 17/02* (2006.01)
*B62K 25/04* (2006.01)

(52) U.S. Cl.
CPC ........ *B60G 17/01933* (2013.01); *B60G 17/015* (2013.01); *B60G 17/017* (2013.01); *B60G 17/021* (2013.01); *B60G 2300/12* (2013.01); *B60G 2500/30* (2013.01); *B62K 2025/044* (2013.01); *B62K 2025/045* (2013.01)

(58) Field of Classification Search
CPC ........... B60G 17/01933; B60G 17/015; B60G 2300/12; B60G 2500/30; B60G 17/017; B60G 17/021; B62K 2025/044; B62K 2025/045
See application file for complete search history.

(56) References Cited

U.S. PATENT DOCUMENTS

| 5,005,916 | A | * | 4/1991 | Fujioka et al. | 303/137 |
| 5,240,313 | A | * | 8/1993 | Yoshino et al. | 303/186 |
| 6,015,155 | A | * | 1/2000 | Brookes et al. | 280/5.505 |
| 6,302,500 | B1 | * | 10/2001 | Aizawa | 303/173 |
| 8,209,086 | B2 | * | 6/2012 | Ohashi et al. | 701/37 |
| 2012/0022750 | A1 | * | 1/2012 | Matsuda | 701/51 |
| 2012/0323460 | A1 | * | 12/2012 | Okubo | 701/74 |

FOREIGN PATENT DOCUMENTS

JP 2008-022680 3/1996

OTHER PUBLICATIONS

Machine translation of JP H09-301150, translated/printed Mar. 19, 2015.*

* cited by examiner

*Primary Examiner* — John Q Nguyen
*Assistant Examiner* — Alan D Hutchinson
(74) *Attorney, Agent, or Firm* — Leason Ellis LLP

(57) ABSTRACT

Technology is provided that enables vehicle speed to be grasped more accurately utilized for adjusting vehicle height. A vehicle height adjusting device includes: a relative position changing device capable of changing relative positions of a vehicle body frame and a rear wheel of a vehicle; a vehicle speed grasping section configured to grasp vehicle speed, which is moving speed of the vehicle body frame; and a change-over valve control section configured to control the relative position changing device on the basis of the vehicle speed grasped by the vehicle speed grasping section and change the relative positions of the vehicle body frame and the rear wheel to adjust vehicle height, which is the height of the vehicle body frame. The vehicle speed grasping section grasps the vehicle speed on the basis of front wheel rotating speed, which is the rotating speed of a front wheel, and rear wheel rotating speed, which is the rotating speed of the rear wheel.

1 Claim, 7 Drawing Sheets

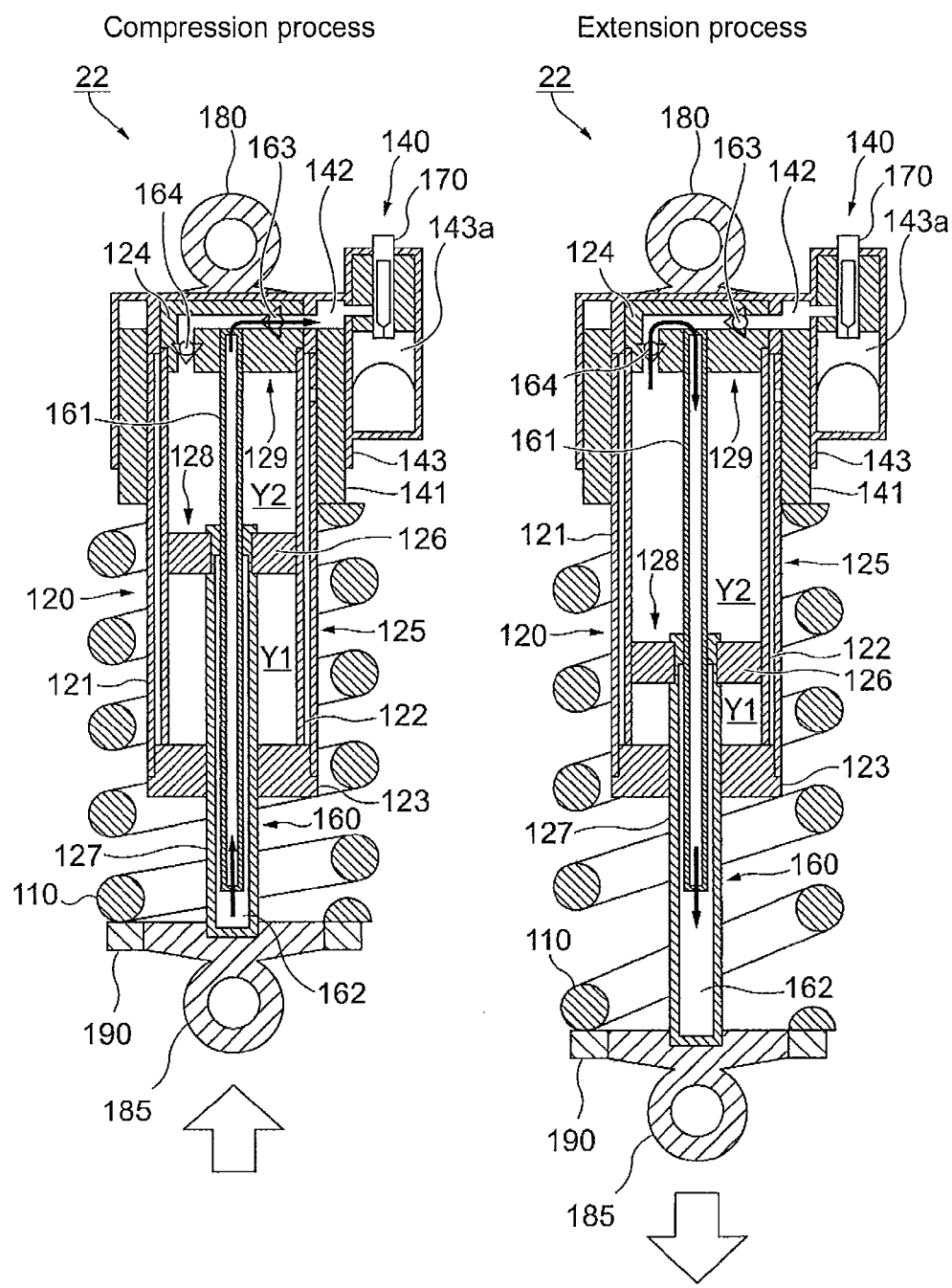

VEHICLE HEIGHT ADJUSTING DEVICE

CROSS REFERENCE TO RELATED APPLICATIONS

This application is based on and claims priority under 35 USC §119 from Japanese Patent Application No. 2012-209767 filed Sep. 24, 2012.

BACKGROUND OF THE INVENTION

1. Field of the Invention

The present invention relates to a vehicle height adjusting device.

2. Description of the Related Art

In recent years, there has been proposed a device for increasing vehicle height during traveling of a motorcycle and reducing the vehicle height during a stop to make it easy to get on and off the motorcycle.

For example, a vehicle height adjusting device described in Japanese Examined Patent Publication No. H8-22680 automatically changes vehicle height in response to the vehicle speed of a motorcycle, automatically increases the vehicle height when the vehicle speed reaches set speed, and automatically reduces the vehicle height when the vehicle speed falls to speed equal to or lower than the set speed.

Patent Document: Japanese Examined Patent Publication No. H8-22680

SUMMARY OF THE INVENTION

In adjusting vehicle height according to the vehicle speed of a vehicle, it is important to highly accurately grasp the vehicle speed. To grasp the vehicle speed of a motorcycle, for example, it is conceivable to provide a sensor for detecting a rotating angle of a front wheel or a rear wheel and calculate the vehicle speed on the basis of an output signal from the sensor. However, since a traveling state of the motorcycle is considered to be a state in which the front wheel or the rear wheel is locked or a state in which the motorcycle is spinning, it is likely that the vehicle speed cannot be highly accurately grasped if an output signal of only one of the states is used.

An object of the present invention is to provide a vehicle speed adjusting device that can more highly accurately grasp vehicle speed for adjusting vehicle height.

To attain the object, the present invention provides a vehicle height adjusting device including: a changing unit capable of changing relative positions of a vehicle main body and a wheel of a vehicle; a vehicle speed grasping unit for grasping vehicle speed, which is the moving speed of the vehicle; and a control unit for controlling the changing unit on the basis of the vehicle speed grasped by the vehicle speed grasping unit and changing the relative positions of the wheel and the vehicle main body to adjust vehicle height, which is the height of the vehicle main body. The vehicle speed grasping unit grasps the vehicle speed on the basis of front wheel rotating speed, which is the rotating speed of a front wheel, and rear wheel rotating speed, which is the rotating speed of a rear wheel.

It is preferable that, in a case where a difference between the front wheel rotating speed and the rear wheel rotating speed is within a range set in advance, the vehicle speed grasping unit grasps the vehicle speed on the basis of any one of the front wheel rotating speed, the rear wheel rotating speed, and an average value of the front wheel rotating speed and the rear wheel rotating speed.

It is preferable that, in a case where a difference between the front wheel rotating speed and the rear wheel rotating speed is out of a range set in advance, the vehicle speed grasping unit grasps the vehicle speed on the basis of any one of the front wheel rotating speed and the rear wheel rotating speed according to the front wheel rotating speed, the rear wheel rotating speed, front wheel rotational acceleration, which is the rotational acceleration of the front wheel, and rear wheel rotational acceleration, which is the rotational acceleration of the rear wheel.

It is preferable that, in a case where the front wheel rotating speed is lower than the rear wheel rotating speed, and in a case where the rear wheel rotational acceleration is equal to or higher than first reference acceleration set in advance or where the rotating speed of an engine of the vehicle is equal to or higher than first reference rotating speed set in advance, the vehicle speed grasping unit grasps the vehicle speed on the basis of the front wheel rotating speed.

It is preferable that, in a case where the front wheel rotating speed is lower than the rear wheel rotating speed, where the rear wheel rotational acceleration is lower than second reference acceleration set in advance, and where the front wheel rotating speed is lower than second reference rotating speed set in advance, the vehicle speed grasping unit grasps the vehicle speed on the basis of the rear wheel rotating speed.

It is preferable that, in a case where the front wheel rotating speed is lower than the rear wheel rotating speed, and in a case where the front wheel rotational acceleration is minus and equal to or lower than third reference acceleration set in advance, the vehicle speed grasping unit grasps the vehicle speed on the basis of the rear wheel rotating speed.

It is preferable that, in a case where the front wheel rotating speed is higher than the rear wheel rotating speed, and in a case where the rear wheel rotational acceleration is minus and equal to or lower than fourth reference acceleration set in advance or where the rotating speed of an engine of the vehicle is lower than third reference rotating speed set in advance, the vehicle speed grasping unit grasps the vehicle speed on the basis of the front wheel rotating speed.

According to the present invention, it is possible to more highly accurately grasp vehicle speed used for adjusting vehicle height.

BRIEF DESCRIPTION OF THE DRAWINGS

FIGS. 3A and 3B are diagrams for explaining the action of a liquid supply device;

DESCRIPTION OF THE PREFERRED EMBODIMENT

An embodiment of the present invention is explained in detail below with reference to the accompanying drawings.

Figure 1:
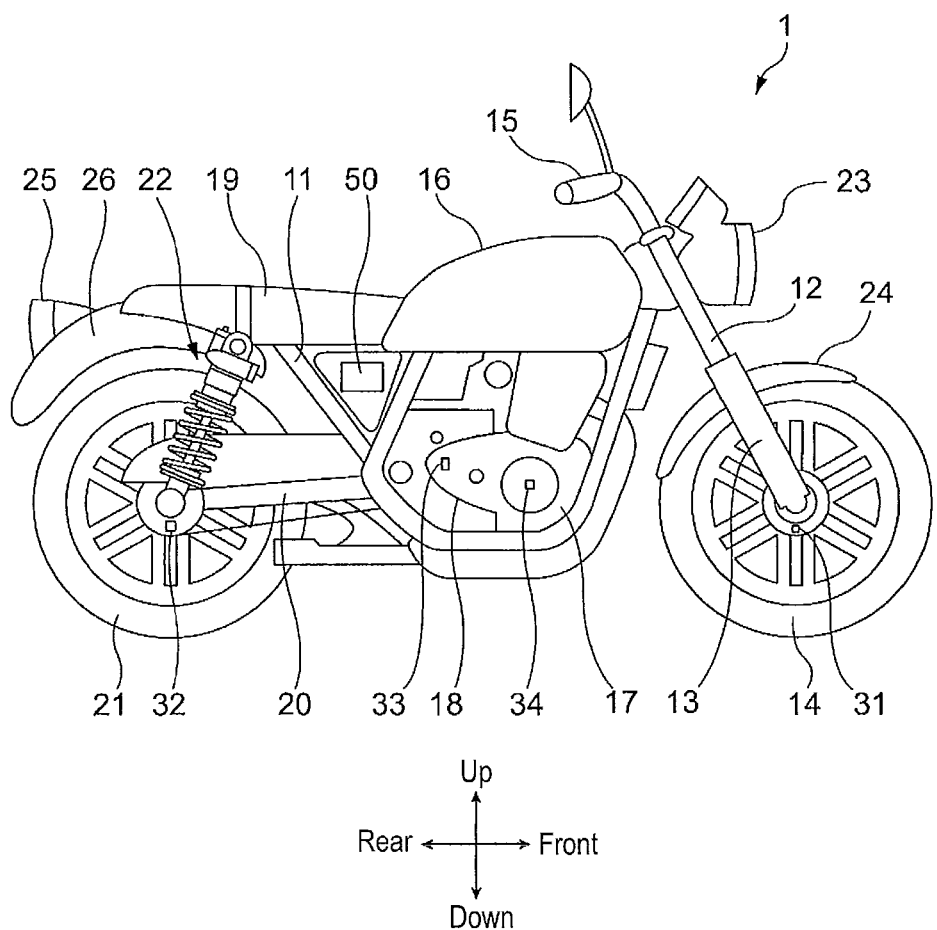
FIG. 1 is a diagram showing a schematic configuration of a motorcycle according to an embodiment.

FIG. 1 is a diagram showing a schematic configuration of a motorcycle 1 according to the embodiment.

The motorcycle 1 includes, as shown in FIG. 1, a vehicle body frame 11, a head pipe 12 attached to the front end of the vehicle body frame 11, a front fork 13 provided in the head pipe 12, and a front wheel 14 attached to the lower end of the front fork 13.

The motorcycle 1 includes a handlebar 15 attached to an upper part of the front fork 13, a fuel tank 16 attached to a front upper part of the vehicle body frame 11, and an engine 17 and a transmission 18 arranged below the fuel tank 16. The transmission 18 is a transmission capable of selecting a reduction gear ratio (a gear) according to operation by a driver. In this embodiment, the transmission 18 includes gears for first gear speed to fifth gear speed.

The motorcycle 1 includes a seat 19 attached to a rear upper part of the vehicle body frame 11, a swing arm 20 swingably attached to a lower part of the vehicle body frame 11, a rear wheel 21 attached to the rear end of the swing arm 20, and a rear suspension 22 attached between a rear part of the wing arm 20 (the rear wheel 21) and a rear part of the vehicle body frame 11. The rear suspension 22 is explained in detail below.

The motorcycle 1 includes a headlamp 23 arranged in front of the head pipe 12, a front fender 24 attached to the front fork 13 to cover an upper part of the front wheel 14, a tail lamp 25 arranged behind the seat 19, and a rear fender 26 attached under the tail lamp 25 to cover an upper part of the rear wheel 21.

The motorcycle 1 includes a front wheel rotation detection sensor 31 configured to detect a rotating angle of the front wheel 14, a rear wheel rotation detection sensor 32 configured to detect a rotating angle of the rear wheel 21, a gear position detection sensor 33 configured to detect the position of a gear of the transmission 18, an engine rotation detection sensor 34 configured to detect a rotating angle of the engine 17, and an acceleration sensor (not shown in the figure) configured to detect the acceleration of the motorcycle 1.

Further, the motorcycle 1 includes a control device 50 configured to control opening and closing of a below-mentioned change-over valve 170 of the rear suspension 22 to control the vehicle height of the motorcycle 1. Output signals from the front wheel rotation detection sensor 31, the rear wheel rotation detection sensor 32, the gear position detection sensor 33, the engine rotation detection sensor 34, the acceleration sensor, and the like are input to the control device 50.

The rear suspension 22 is explained in detail.

Figure 2:
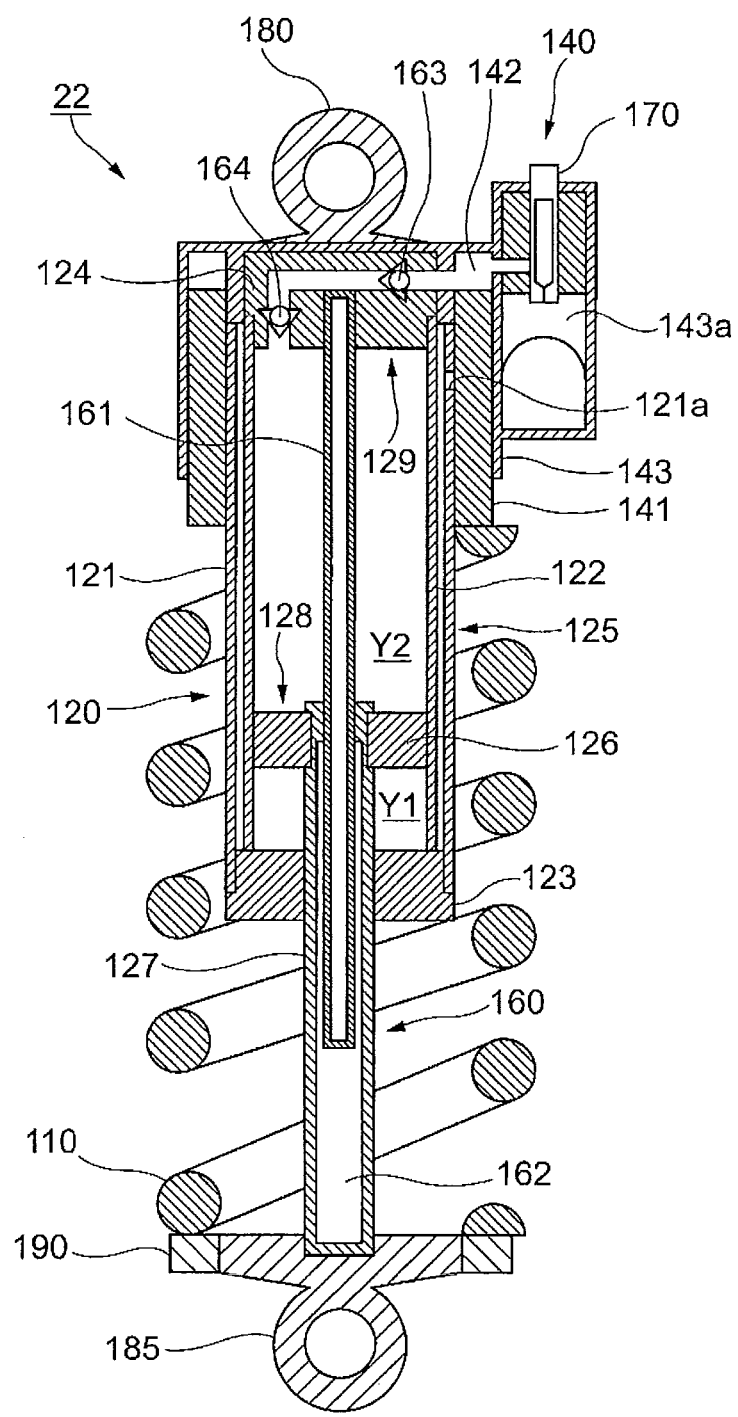
FIG. 2 is a sectional view of a rear suspension.

FIG. 2 is a sectional view of the rear suspension 22.

The rear suspension 22 is attached between the vehicle body frame 11, which is an example of a vehicle main body, and the rear wheel 21, which is an example of a wheel of the motorcycle 1. The rear suspension 22 includes a suspension spring 110 configured to support the vehicle weight of the motorcycle 1 and absorb a shock and a shock absorber (a damper) 120 configured to attenuate the vibration of the suspension spring 110. The rear suspension 22 includes a relative position changing device 140 capable of changing relative positions of the vehicle body frame 11 and the rear wheel 21 by adjusting a spring force of the suspension spring 110 and a liquid supply device 160 configured to supply liquid to the relative position changing device 140. Further, the rear suspension 22 includes a vehicle body side attachment member 180 for attaching the rear suspension 22 to the vehicle body frame 11, an axle side attachment member 185 for attaching the rear suspension 22 to the rear wheel 21, and a spring bearing 190 attached to the axle side attachment member 185 and configured to support one end (in FIG. 2, a lower part) in a center line direction in the suspension spring 110.

The shock absorber 120 includes, as shown in FIG. 2, a cylinder 125 including an outer cylinder 121 having a thin cylindrical shape, an inner cylinder 122 having a thin cylindrical shape housed in the outer cylinder 121, a bottom lid 123 configured to close one end (in FIG. 2, a lower part) in the center line direction (in FIG. 2, the up down direction) of a cylinder of the cylindrical outer cylinder 121, and an upper lid 124 configured to close the other end (in FIG. 2, an upper part) in the center line direction of the inner cylinder 122. In the following explanation, the center line direction of the cylinder of the outer cylinder 121 is simply referred to as "center line direction".

The shock absorber 120 includes a piston 126 inserted into the inner cylinder 122 to be capable of moving in the center line direction and a piston rod 127 configured to extend in the center line direction and support the piston 126 at the other end (in FIG. 2, the upper end) in the center line direction. The piston 126 is in contact with the inner circumferential surface of the inner cylinder 122 and partitions a space in which liquid (in this embodiment, oil) is encapsulated in the cylinder 125 into a first oil chamber Y1 further on one end side in the center line direction than the piston 126 and a second oil chamber Y2 further on the other end side in the center line direction than the piston 126. The piston rod 127 is a cylindrical member. A below-mentioned pipe 161 is inserted into the inside of the piston rod 127.

The shock absorber 120 includes a first damping force generating device 128 arranged on the other end side in the center line direction in the piston rod 127 and a second damping force generating device 129 arranged on one end side in the center line direction in the inner cylinder 122. The first damping force generating device 128 and the second damping force generating device 129 attenuate stretching vibration of the cylinder 125 and the piston rod 127 involved in absorption of an impact force from the road surface by the suspension spring 110. The first damping force generating device 128 is arranged to function as a communication path between the first oil chamber Y1 and the second oil chamber Y2. The second damping force generating device 129 is arranged to function as a communication path between the second oil chamber Y2 and a below-mentioned jack chamber 142 of the relative position changing device 140.

The liquid supply device 160 is a device configured to perform a pumping action according to telescopic motion of the piston rod 127 with respect to the cylinder 125 and supply the liquid into the jack chamber 142 of the relative position changing device 140.

The liquid supply device 160 includes a cylindrical pipe 161 fixed to the upper lid 124 of the shock absorber 120 to extend in the center line direction. The pipe 161 is coaxially inserted in a pump chamber 162, which is the inside of the cylindrical piston rod 127.

The liquid supply device 160 includes a check valve for ejection 163 configured to eject the liquid in the pump chamber 162, which is pressurized by the movement of the piston rod 127 in a direction for entering the cylinder 125 and the pipe 161, to the jack chamber 142 side and a check valve for suction 164 configured to suck the liquid in the cylinder 125 into the pump chamber 162 in which negative pressure is generated by the movement of the piston rod 127 in a direction for exiting the cylinder 125 and the pipe 161.

FIGS. 3A and 3B are diagrams for explaining the action of the liquid supply device 160.

In the liquid supply device 160 configured as explained above, when the motorcycle 1 travels and the rear suspension 22 receives a force because of unevenness of the road surface, the piston rod 127 performs a pumping action according to telescopic motion of the piston rod 127 entering and exiting the cylinder 125 and the pipe 161. When the pump chamber 162 is pressurized by the pumping action, the liquid in the pump chamber 162 opens the check valve for ejection 163 and is ejected to the jack chamber 142 side of the relative position changing device 140 (see FIG. 3A). When negative pressure is generated in the pump chamber 162, the liquid in the second oil chamber Y2 of the cylinder 125 opens the check valve for suction 164 and is sucked into the pump chamber 162 (see FIG. 3B).

The relative position changing device 140 includes a supporting member 141 arranged to cover the outer circumference of the cylinder 125 of the shock absorber 120 and configured to support the other end (in FIG. 2, an upper part) in the center line direction in the suspension spring 110 and a hydraulic jack 143 arranged to cover the outer circumference of the other end side (in FIG. 2, the upper side) in the center line direction in the cylinder 125 and configured to form the jack chamber 142 in conjunction with the supporting member 141. The liquid in the cylinder 125 is filled in the jack chamber 142 or the liquid is discharged from the inside of the jack chamber 142, whereby the supporting member 141 moves in the center line direction with respect to the hydraulic jack 143. The vehicle body side attachment member 180 is attached to an upper part of the hydraulic jack 143. The supporting member 141 moves in the center line direction with respect to the hydraulic jack 143, whereby a spring force of the suspension spring 110 changes and a relative position of the seat 19 with respect to the rear wheel 21 changes.

The relative position changing device 140 includes a change-over valve 170 closed to store the liquid supplied to the jack chamber 142 in the jack chamber 142 and opened to discharge the liquid supplied to the jack chamber 142 to a liquid reservoir chamber 143a formed in the hydraulic jack 143. The change-over valve 170 can be illustrated as a well-known solenoid actuator.

Figure 4A:
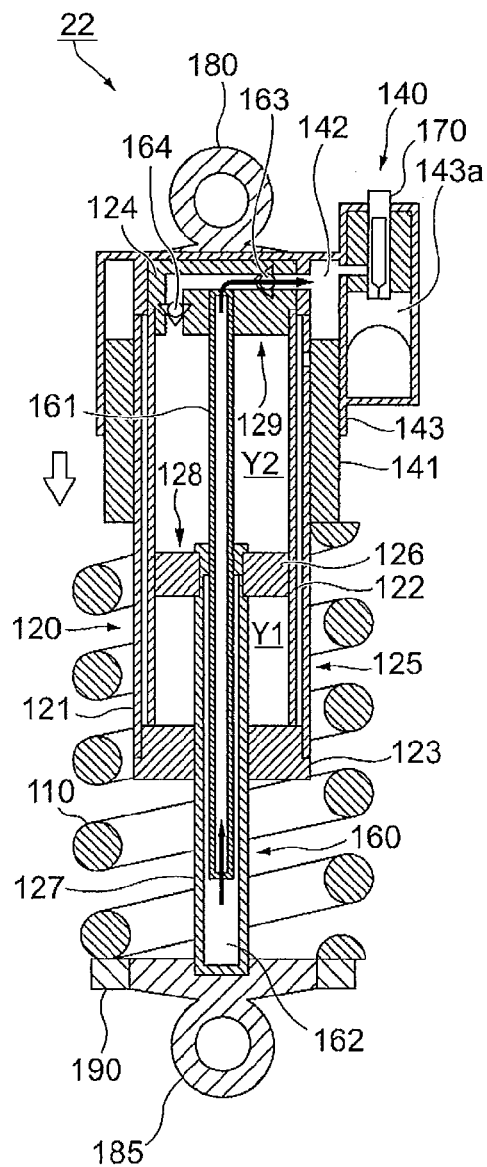
FIGS. 4A and 4B are diagrams for explaining vehicle height adjustment by a relative position changing device.
Figure 4B:
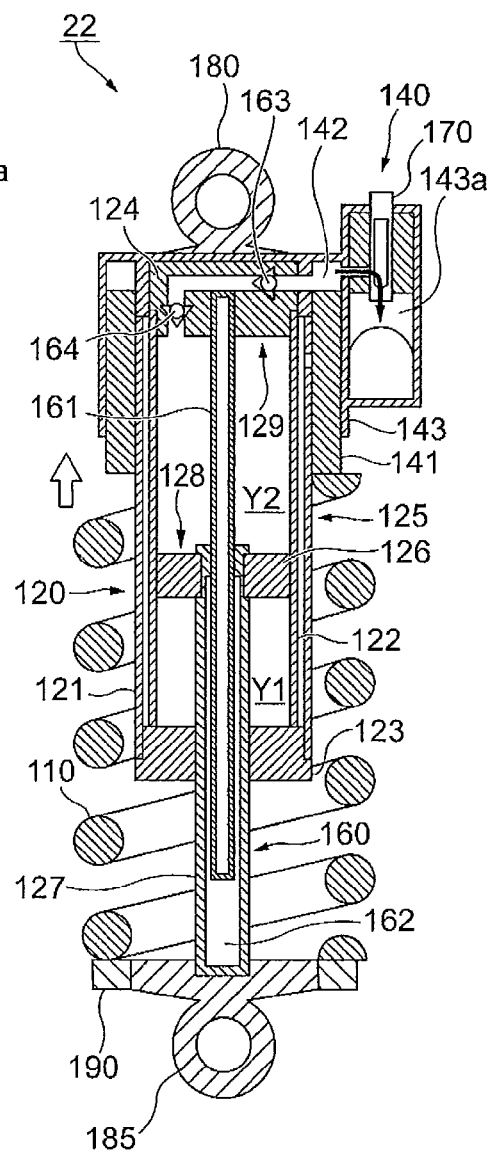

FIGS. 4A and 4B are diagrams for explaining vehicle height adjustment by the relative position changing device 140.

If the liquid is supplied into the jack chamber 142 by the liquid supply device 160 when the change-over valve 170 is closed, the liquid is filled in the jack chamber 142, the supporting member 141 moves to one end side (in FIGS. 4A and 4B, the lower side) in the center line direction with respect to the hydraulic jack 143, and the spring length of the suspension spring 110 decreases (see FIG. 4A). On the other hand, when the change-over valve 170 is opened, the liquid in the jack chamber 142 is discharged to the liquid reservoir chamber 143a, the supporting member 141 moves to the other end side (in FIGS. 4A and 4B, the upper side) in the center line direction with respect to the hydraulic jack 143, and the spring length of the suspension spring 110 increases (see FIG. 4B).

When the spring length of the suspension spring 110 decreases because the supporting member 141 moves with respect to the hydraulic jack 143, the spring force of the suspension spring 110 pushing the supporting member 141 increases compare with the spring force before the supporting member 141 moves with respect to the hydraulic jack 143. In such a case, when the same force acts on one end side (in FIGS. 4A and 4B, the lower side) in the center line direction from the vehicle body frame 11 (seat 19) side, a sinking amount of the rear suspension 22 (a change in the distance between the vehicle body side attachment member 180 and the axle side attachment member 185) decreases. Therefore, when the sprig length of the suspension spring 110 decreases because the supporting member 141 moves with respect to the hydraulic jack 143, the height of the seat 19 increases (the vehicle height increases) compared with the height before the supporting member 141 moves with respect to the hydraulic jack 143. That is, the vehicle height increases because the change-over valve 170 is closed.

On the other hand, when the spring length of the suspension spring 110 increases because the supporting member 141 moves with respect to the hydraulic jack 143, the spring force of the suspension spring 110 pushing the supporting member 141 decreases compared with the spring force before the supporting member 141 moves with respect to the hydraulic jack 143. In such a case, when the same force acts on one end side (in FIGS. 4A and 4B, the lower side) in the center line direction from the vehicle body frame 11 (seat 19) side, the sinking amount of the rear suspension 22 (the change in the distance between the vehicle body side attachment member 180 and the axle side attachment member 185) increases. Therefore, when the spring length of the suspension spring 110 increases because the supporting member 141 moves with respect to the hydraulic jack 143, the height of the seat 19 decreases (the vehicle height decreases) compared with the height before the supporting member 141 moves with respect to the hydraulic jack 143. That is, because the change-over valve 170 is opened, the vehicle height is smaller than the vehicle height at the time when the change-over valve 170 is closed.

The opening and closing of the change-over valve 170 is controlled by the control device 50.

When the change-over valve 170 is opened, the liquid supplied to the jack chamber 142 may be discharged to the first oil chamber Y1 and/or the second oil chamber Y2 in the cylinder 125.

As shown in FIG. 2, a return path 121a is formed in the outer cylinder 121 of the cylinder 125. The return path 121a is a path for returning the liquid in the jack chamber 142 to the cylinder 125 when the supporting member 141 moves to a limit position set in advance on one end side (in FIG. 2, the lower side) in the center line direction with respect to the hydraulic jack 143.

Figure 5:
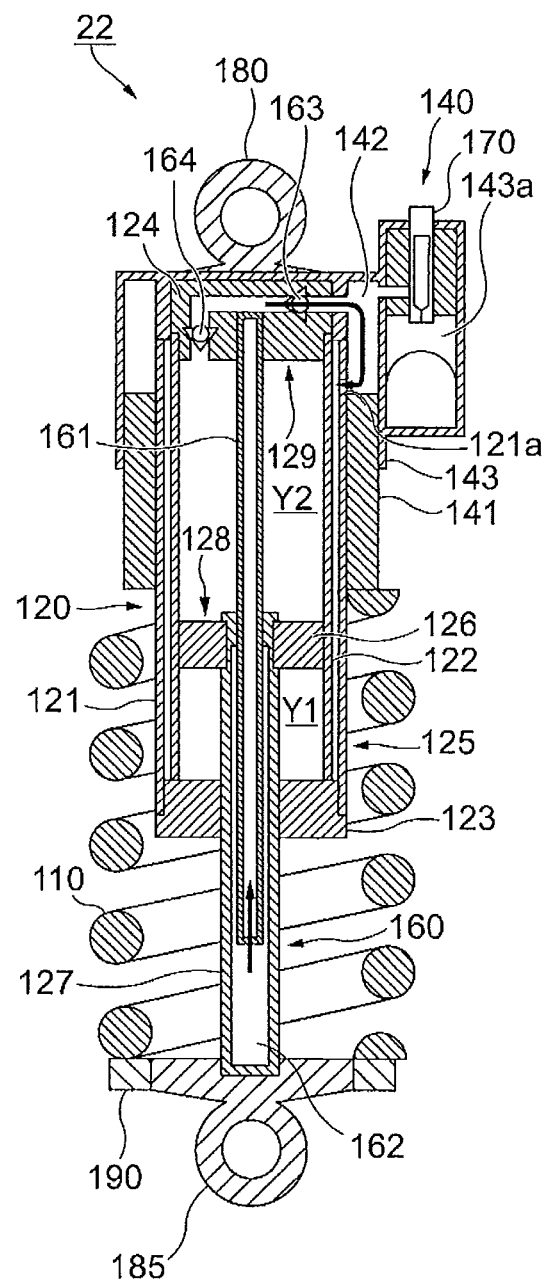
FIG. 5 is a diagram showing a mechanism in which vehicle height is maintained.

FIG. 5 is a diagram showing a mechanism in which vehicle height is maintained.

Even if the liquid continues to be supplied into the jack chamber 142 when the change-over valve 170 is closed, since the supplied liquid is returned into the cylinder 125 by the return path 121a, the position of the supporting member 141 with respect to the hydraulic jack 143 and the height of the seat 19 (the vehicle height) are maintained.

The control device 50 is explained.

Figure 6:
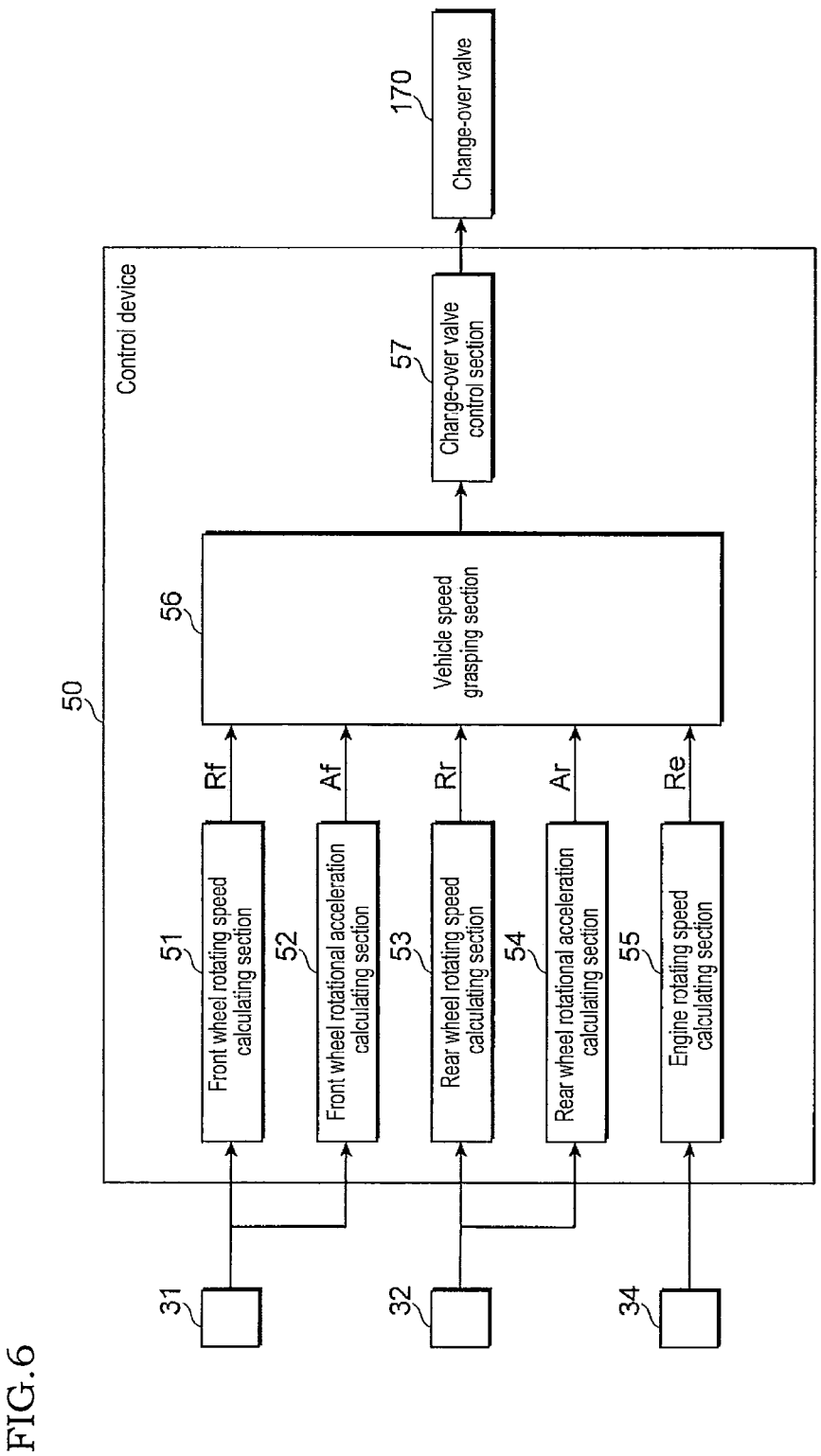
FIG. 6 is a block diagram of a control device.

FIG. 6 is a block diagram of the control device 50.

The control device 50 includes a CPU, a ROM having stored therein computer programs executed by the CPU, various data, and the like, a RAM used as a work memory and the like of the CPU, and an electrically erasable and programmable read only memory (EEPROM). Output signals from the front wheel rotation detection sensor 31, the rear wheel rotation detection sensor 32, the gear position detection sensor 33, the engine rotation detection sensor 34, and the like are input to the control device 50.

The control device 50 includes a front wheel rotating speed calculating section 51 configured to calculate front wheel rotating speed Rf, which is the rotating speed of the front wheel 14, on the basis of the output signal from the front wheel rotation detection sensor 31 and a front wheel rotational acceleration calculating section 52 configured to calculate front wheel rotational acceleration Af, which is the rotational acceleration of the front wheel 14, on the basis of the output signal from the front wheel rotation detection sensor 31. The control device 50 includes a rear wheel rotation speed calculating section 53 configured to calculate rear wheel rotating speed Rr, which is the rotating speed of the rear wheel 21, on the basis of the output signal from the rear wheel rotation detection sensor 32 and a rear wheel rotational acceleration calculating section 54 configured to calculate rear wheel rotational acceleration Ar, which is the rotational acceleration of the rear wheel 21, on the basis of the output signal from the rear wheel rotation detection sensor 32. The control device 50 includes an engine rotating speed calculating section 55 configured to calculate engine rotating speed Re, which is the rotating speed of the engine 17, on the basis of the output signal from the engine rotation detection sensor 34. The front wheel rotating speed calculating section 51, the front wheel rotational acceleration calculating section 52, the rear wheel rotating speed calculating section 53, the rear wheel rotational acceleration calculating section 54, and the engine rotating speed calculating section 55 respectively grasp rotating angles on the basis of pulse signals, which are the output signals from the sensors, and differentiate the rotating angles with an elapsed time to calculate the rotating speeds or differentiate the rotating speeds with time to calculate the rotational accelerations.

The control device 50 includes a vehicle speed grasping section 56 configured to grasp vehicle speed Vc, which is the moving speed of the motorcycle 1, on the basis of the front wheel rotating speed Rf calculated by the front wheel rotating speed calculating section 51, the front wheel rotational acceleration Af calculated by the front wheel rotational acceleration calculating section 52, the rear wheel rotating speed Rr calculated by the rear wheel rotating speed calculating section 53, the rear wheel rotational acceleration Ar calculated by the rear wheel rotational acceleration calculating section 54, and the engine rotating speed Re calculated by the engine rotating speed calculating section 55. The control device 50 includes a change-over valve control section 57 configured to control opening and closing of the change-over valve 170 of the relative position changing device 140 on the basis of the vehicle speed Vc grasped by the vehicle speed grasping section 56. The vehicle speed grasping section 56 is explained below.

The change-over valve control section 57 controls the change-over valve 170 to increase the vehicle height and improve steering performance while the motorcycle 1 is traveling in earnest (at speed equal to or higher than predetermined speed (the predetermined speed depends on the specifications of the motorcycle 1)) and reduce the vehicle height to make it easy to get on and off the motorcycle 1 when a rider is considered to get on or off the motorcycle 1. More specifically, when the vehicle speed Vc grasped by the vehicle speed grasping section 56 is equal to or higher than rising reference vehicle speed Vtu set in advance, the change-over valve control section 57 closes the change-over valve 170 to increase the vehicle height. On the other hand, when the vehicle speed Vc grasped by the vehicle speed grasping section 56 is lower than falling reference vehicle speed Vtd set in advance, the change-over valve control section 57 opens the change-over valve 170 to reduce the vehicle height.

The rising reference vehicle speed Vtu can be illustrated as 8 km/h and the falling reference vehicle speed Vtd can be illustrated as 5 km/h. In such a case, when the vehicle speed Vc grasped by the vehicle speed grasping section 56 is equal to or higher than 8 km/h, the change-over control section 57 closes the change-over valve 170. When the vehicle speed Vc grasped by the vehicle speed grasping section 56 is lower than 5 km/h, the change-over valve control section 57 opens the change-over valve 170.

The vehicle speed grasping section 56 is explained.

As a traveling state of the motorcycle 1, a state in which the motorcycle 1 is traveling with the front wheel 14 kept locked is conceivable. In such a case, since the front wheel 14 is not rotating, it is difficult to grasp accurate vehicle speed Vc on the basis of the rotating speed of the front wheel 14, that is, the rotating speed of the front wheel 14 calculated by the front wheel rotating speed calculating section 51. As the traveling state of the motorcycle 1, a state in which the motorcycle 1 is traveling with the front wheel 14 kept lifted from the ground, so-called wheelie is also conceivable. In such a case, since the front wheel 14 is lifted from the ground and spinning by inertia, it is difficult to grasp accurate vehicle speed Vc on the basis of the rotating speed of the front wheel 14, that is, the rotating speed of the front wheel 14 calculated by the front wheel rotating speed calculating section 51.

As the traveling state of the motorcycle 1, a state in which the motorcycle 1 is traveling with the rear wheel 21 kept locked is also conceivable. In such a case, since the rear wheel 21 is not rotating, it is difficult to grasp accurate vehicle speed Vc on the basis of the rotating speed of the rear wheel 21, that is, the rotating speed of the rear wheel 21 calculated by the rear wheel rotating speed calculating section 53. As the traveling state of the motorcycle 1, a state in which the rear wheel 21 is spinning is also conceivable. In such a case, since the rear wheel 21 is spinning, it is difficult to grasp accurate vehicle speed Vc on the basis of the rotating speed of the rear wheel 21, that is, the rotating speed of the rear wheel 21 calculated by the rear wheel rotating speed calculating section 53.

The vehicle speed grasping section 56 according to this embodiment grasps the vehicle speed Vc as explained below.

When a difference between the front wheel rotating speed Rf, which is the rotating speed of the front wheel 14, calculated by the front wheel rotating speed calculating section 51 and the rear wheel rotating speed Rr, which is the rotating speed of the rear wheel 21, calculated by the rear wheel rotating speed calculating section 53 is within a predetermined range set in advance, the vehicle speed grasping section 56 considers that the motorcycle 1 is traveling in a normal state in which the front wheel 14 and the rear wheel 21 are grounded and rotating and grasps the vehicle speed Vc with a normal method. The normal method can be illustrated as a method of grasping the vehicle speed Vc by calculating the moving speed of the front wheel 14 or the rear wheel 21 using the front wheel rotating speed Rf or the rear wheel rotating speed Rr. The moving speed of the front wheel 14 can be calculated using the front wheel rotating speed Rf and the outer diameter of a tire of the front wheel 14. The moving speed of the rear wheel 21 can be calculated using the rear wheel rotating speed Rr and the outer diameter of a tire of the rear wheel 21. When the motorcycle 1 is traveling in the normal state, the vehicle speed Vc can be understood as being equal to the moving speed of the front wheel 14 and/or the moving speed of the rear wheel 21.

The vehicle speed grasping section 56 may use, as the normal method, a method of grasping the vehicle speed Vc by calculating average moving speed of the front wheel 14 and the rear wheel 21 using an average value of the front wheel rotating speed Rf and the rear wheel rotating speed Rr. The average value of the front wheel rotating speed Rf and the rear wheel rotating speed Rr can be illustrated as an arithmetic means ($=(Rf+Rr)/2$) or a weighted mean ($=(Rf \times \alpha(\%)/100 + Rr \times (100-\alpha)(\%)/100)/2$), $\alpha$ is a coefficient depending on a vehicle type).

On the other hand, when the difference between the front wheel rotating speed Rf and the rear wheel rotating speed Rr is outside the predetermined range set in advance, the vehicle speed grasping section 56 grasps the vehicle speed Vc using any one of the front wheel rotating speed Rf, which is the rotating speed of the front wheel 14, calculated by the front wheel rotating speed calculating section 51 and the rear wheel rotating speed Rr, which is the rotating speed of the rear wheel 21, calculated by the rear wheel rotating speed calculating section 53.

That is, when the front wheel rotating speed Rf is lower than the rear wheel rotating speed Rr and the rear wheel rotational acceleration Ar, which is the rotational acceleration of the rear wheel 21, calculated by the rear wheel rotational acceleration calculating section 54 is equal to or higher than first reference acceleration A1 set in advance, the rear wheel 21 is considered to be spinning. Therefore, the vehicle speed grasping section 56 grasps the vehicle speed Vc by calculating the moving speed of the front wheel 14 using the front wheel rotating speed Rf, which is the rotating speed of the front wheel 14, calculated by the front wheel rotating speed calculating section 51.

When the front wheel rotating speed Rf is lower than the rear wheel rotating speed Rr and the engine rotating speed Re, which is the rotating speed of the engine 17, calculated by the engine rotating speed calculating section 55 is equal to or higher than first reference rotating speed V1 set in advance, the rear wheel 21 is considered to be spinning. Therefore, the vehicle speed grasping section 56 grasps the vehicle speed Vc by calculating the moving speed of the front wheel 14 using the front wheel rotating speed Rf, which is the rotating speed of the front wheel 14, calculated by the front wheel rotating speed calculating section 51.

When the front wheel rotating speed Rf is lower than the rear wheel rotating speed Rr, the rear wheel rotational acceleration Ar, which is the rotational acceleration of the rear wheel 21, calculated by the rear wheel rotational acceleration calculating section 54 is lower than second reference acceleration A2 set in advance, and the front wheel rotating speed Rf is lower than second reference rotating speed V2 set in advance, the motorcycle 1 is in a state of so-called wheelie in which the motorcycle 1 is traveling with the front wheel 14 kept lifted from the ground. Therefore, the vehicle speed grasping section 56 grasps the vehicle speed Vc by calculating the moving speed of the rear wheel 21 using the rear wheel rotating speed Rr, which is the rotating speed of the rear wheel 21, calculated by the rear wheel rotating speed calculating section 53.

When the front wheel rotating speed Rf is lower than the rear wheel rotating speed Rr and the front wheel rotational acceleration Af, which is the rotational acceleration of the front wheel 14, calculated by the front wheel rotational acceleration calculating section 52 is minus and equal to or lower than third reference acceleration A3 set in advance, the front wheel 14 is considered to be locked. Therefore, the vehicle speed grasping section 56 grasps the vehicle speed Vc by calculating the moving speed of the rear wheel 21 using the rear wheel rotating speed Rr, which is the rotating speed of the rear wheel 21, calculated by the rear wheel rotating speed calculating section 53.

When the front wheel rotating speed Rf is higher than the rear wheel rotating speed Rr and the rear wheel rotational acceleration Ar, which is the rotational acceleration of the rear wheel 21, calculated by the rear wheel rotational acceleration calculating section 54 is minus and equal to or lower than fourth reference acceleration A4 set in advance, the rear wheel 21 is considered to be locked. Therefore, the vehicle speed grasping section 56 grasps the vehicle speed Vc by calculating the moving speed of the front wheel 14 using the front wheel rotating speed Rf, which is the rotating speed of the front wheel 14, calculated by the front wheel rotating speed calculating section 51.

When the front wheel rotating speed Rf is higher than the rear wheel rotating speed Rr and the engine rotating speed Re, which is the rotating speed of the engine 17, calculated by the engine rotating speed calculating section 55 is lower than third reference rotating speed V3 set in advance, the rear wheel 21 is considered to be locked. Therefore, the vehicle speed grasping section 56 grasps the vehicle speed Vc by calculating the moving speed of the front wheel 14 using the front wheel rotating speed Rf, which is the rotating speed of the front wheel 14, calculated by the front wheel rotating speed calculating section 51.

The first reference acceleration A1, the second reference acceleration A2, the third reference acceleration A3, the fourth reference acceleration A4, the first reference rotating speed V1, the second reference rotating speed V2, and the third reference rotating speed V3 are values arbitrarily set for each vehicle type of the motorcycle 1.

A procedure of vehicle speed grasping processing for grasping the vehicle speed Vc performed by the vehicle speed grasping section 56 is explained with reference to a flowchart.

Figure 7:
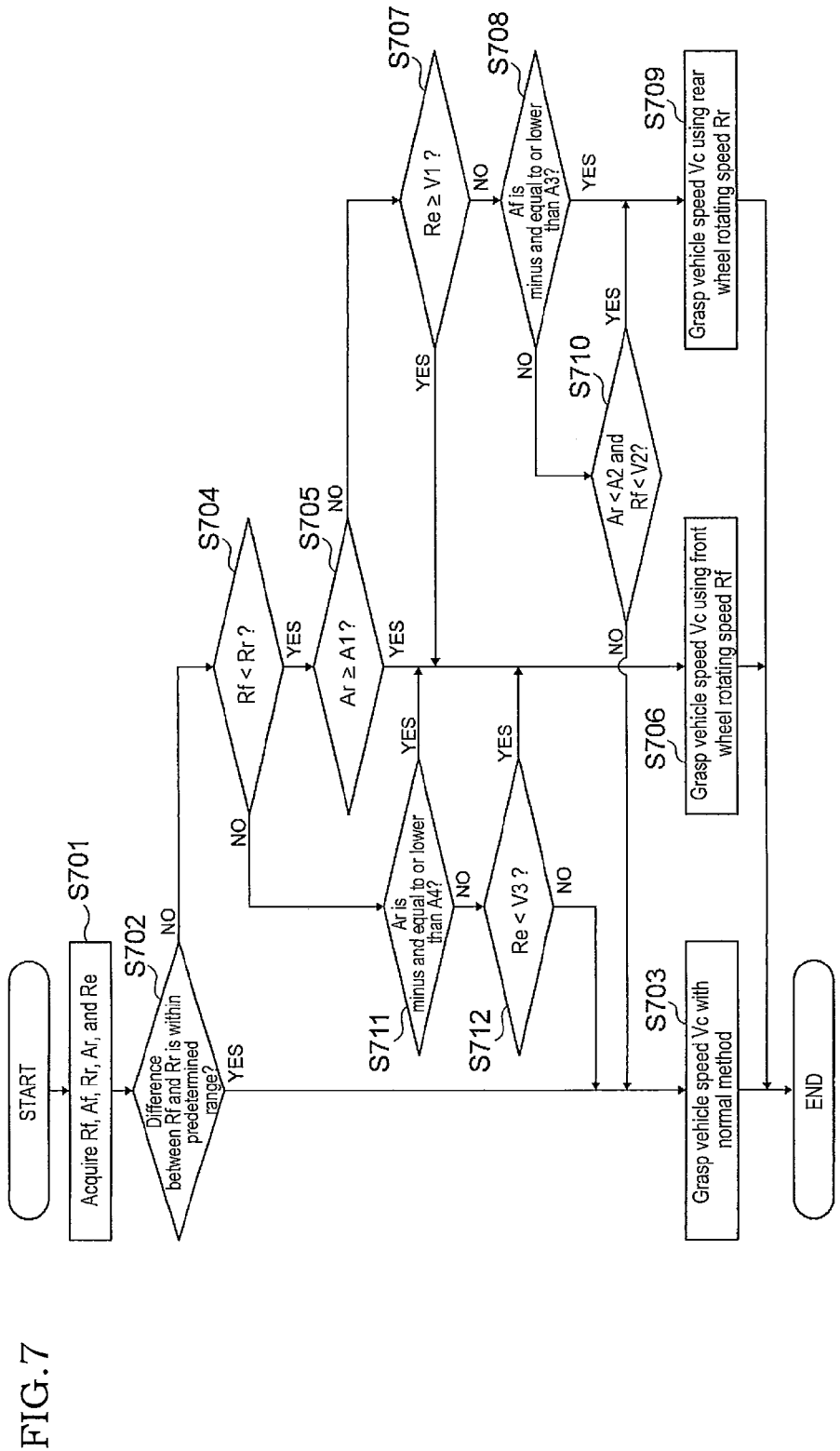
FIG. 7 is a flowchart for explaining a procedure of vehicle speed grasping processing for grasping vehicle speed performed by a vehicle speed grasping section.

FIG. 7 is a flowchart for explaining the procedure of the vehicle speed grasping processing for grasping the vehicle speed Vc performed by the vehicle speed grasping section 56. The vehicle speed grasping section 56 repeatedly executes the vehicle speed grasping processing in each period set in advance. The vehicle speed grasping section 56 outputs the grasped vehicle speed Vc to the change-over valve control section 57.

First, the vehicle speed grasping section 56 reads the front wheel rotating speed Rf, the front heel rotational acceleration Af, the rear wheel rotating speed Rr, the rear wheel rotational acceleration Ar, and the engine rotating speed Re stored in the RAM to thereby acquire the same (step (hereinafter simply referred to as "S") 701). Thereafter, the vehicle speed grasping section 56 discriminates whether a difference between the front wheel rotating speed Rf and the rear wheel rotating speed Rr acquired in S701 is within a predetermined range set in advance (S702). When the difference between the front wheel rotating speed Rf and the rear wheel rotating speed Rr is within the predetermined range set in advance (YES in S702), the vehicle speed grasping section 56 grasps the vehicle speed Vc with the normal method explained above (S703). That is, the vehicle speed grasping section 56 grasps the vehicle speed Vc by calculating the moving speed of the front wheel 14 or the rear wheel 21 using the front wheel rotating speed Rf, the rear wheel rotating speed Rr, or an average value of the front wheel rotating speed Rf and the rear wheel rotating speed Rr.

On the other hand, when the difference between the front wheel rotating speed Rf and the rear wheel rotating speed Rr is outside the predetermined range set in advance (NO in S702), the vehicle speed grasping section 56 discriminates whether the front wheel rotating speed Rf is lower than the rear wheel rotating speed Rr (S704). When the front wheel rotating speed Rf is lower than the rear wheel rotating speed Rr (YES in S704), the vehicle speed grasping section 56 discriminates whether the rear wheel rotational acceleration Ar is equal to or higher than the first reference acceleration A1 (S705). When the rear wheel rotational acceleration Ar is equal to or higher than the first reference acceleration A1

(YES in S705), the vehicle speed grasping section 56 grasps the vehicle speed Vc using the front wheel rotating speed Rf (S706).

On the other hand, when the rear wheel rotational acceleration Ar is not equal to or higher than the first reference acceleration A1 (NO in S705), the vehicle speed grasping section 56 discriminates whether the engine rotating speed Re, which is the rotating speed of the engine 17, calculated by the engine rotating speed calculating section 55 is equal to or higher than the first reference rotating speed V1 set in advance (S707). When the engine rotating speed Re is equal to or higher than the first reference rotating speed V1 (YES in S707), the vehicle speed grasping section 56 grasps the vehicle speed Vc using the front wheel rotating speed Rf (S706).

On the other hand, when the engine rotating speed Re is not equal to or higher than the first reference rotating speed V1 (NO in S707), the vehicle speed grasping section 56 discriminates whether the front wheel rotational acceleration Af is minus and equal to or lower than the third reference acceleration A3 (S708). When the front wheel rotational acceleration Af is minus and equal to or lower than the third reference acceleration A3 (YES in S708), the vehicle speed grasping section 56 grasps the vehicle speed Vc using the rear wheel rotating speed Rr (S709).

On the other hand, when the front wheel rotational acceleration Af is minus and is not equal to or lower than the third reference acceleration A3 (NO in S708), the vehicle speed grasping section 56 discriminates whether the rear wheel rotational acceleration Ar is lower than the second reference acceleration A2 and the front rotating speed Rf is lower than the second reference rotating speed V2 (S710). When the rear wheel rotational acceleration Ar is lower than the second reference acceleration A2 and the front wheel rotating speed Rf is lower than the second reference rotating speed V2 (YES in S710), the vehicle speed grasping section 56 grasps the vehicle speed Vc using the rear wheel rotating speed Rr (S709). On the other hand, when the rear wheel rotational acceleration Ar is lower than the second reference acceleration A2 and the front wheel rotating speed Rf is not lower than the second reference rotating speed V2 (NO in S710), the vehicle speed grasping section 56 grasps the vehicle speed Vc with the normal method explained above (S703).

On the other hand, when the front wheel rotating speed Rf is not lower than the rear wheel rotating speed Rr (NO in S704), that is, when the front wheel rotating speed Rf is higher than the rear wheel rotating speed Rr, the vehicle speed grasping section 56 discriminates whether the rear wheel rotational acceleration Ar is minus and equal to or lower than the fourth reference acceleration A4 (S711). When the rear wheel rotational acceleration Ar is minus and equal to or lower than the fourth reference acceleration A4 (YES in S711), the vehicle speed grasping section 56 grasps the vehicle speed Vc using the front wheel rotating speed Rf (S706).

On the other hand, when the rear wheel rotational acceleration Ar is minus and is not equal to or lower than the fourth reference acceleration A4 (NO in S711), the vehicle speed grasping section 56 discriminates whether the engine rotating speed Re is lower than the third reference rotating speed V3 (S712). When the engine rotating speed Re is lower than the third reference rotating speed V3 (YES in S712), the vehicle speed grasping section 56 grasps the vehicle speed Vc using the front rotating speed Rf (S706). On the other hand, when the engine rotating speed Re is not lower than the third reference rotating speed V3 (NO in S712), the vehicle speed grasping section 56 grasps the vehicle speed Vc with the normal method explained above (S703).

The front wheel rotating speed calculating section 51, the front wheel rotational acceleration calculating section 52, the rear wheel rotating speed calculating section 53, the rear wheel rotational acceleration calculating section 54, and the engine rotating speed calculating section 55 respectively calculate the front wheel rotating speed Rf, the front wheel rotational acceleration Af, the rear wheel rotating speed Rr, the rear wheel rotational acceleration Ar, and the engine rotating speed Re at a period equal to or shorter than a period of the execution of the vehicle speed grasping processing by the vehicle-speed grasping section 56 and store the same in the RAM.

The vehicle speed grasping section 56 performs the vehicle speed grasping processing as explained above. Consequently, it is possible to more highly accurately grasp the vehicle speed Vc.

The change-over valve control section 57 according to this embodiment opens and closes the change-over valve 170 on the basis of the vehicle speed Vc grasped by the vehicle speed grasping section 56. Therefore, it is possible to increase the vehicle height and reduce the vehicle height at more appropriate timings.

REFERENCE SIGNS LIST

1 motorcycle, 11 vehicle body frame, 18 transmission, 21 rear wheel, 22 rear suspension, 33 gear position detection sensor, 34 engine rotation detection sensor, 50 control device, 51 front wheel rotating speed calculating section, 52 front wheel rotational acceleration calculating section, 53 rear wheel rotating speed calculating section, 54 rear wheel rotational acceleration calculating section, 55 engine rotating speed calculating section, 56 vehicle speed grasping section, 57 change-over valve control section, 110 suspension spring, 120 shock absorber, 140 relative position changing device, 160 liquid supply device, 180 vehicle body side attachment member, 185 axle side attachment member

What is claimed is:

1. A vehicle height adjusting device for a two-wheeled vehicle comprising:
   a changing unit capable of changing relative positions of a vehicle main body and a wheel of the two-wheeled vehicle;
   a vehicle speed grasping unit for grasping vehicle speed, which is moving speed of the vehicle; and
   a control unit for controlling the changing unit on the basis of the vehicle speed grasped by the vehicle speed grasping unit and changing the relative positions of the wheel and the vehicle main body to adjust vehicle height, which is height of the vehicle main body, wherein
   in a case where a difference between front wheel rotating speed, which is rotating speed of a front wheel, and rear wheel rotating speed, which is rotating speed of a rear wheel, is within a range set in advance, the vehicle speed grasping unit grasps the vehicle speed with a normal method that grasps the vehicle speed on the basis of any one of the front wheel rotating speed, the rear wheel rotating speed, and an average value of the front wheel rotating speed and the rear wheel rotating speed,
   in a case where the difference between the front wheel rotating speed and the rear wheel rotating speed is out of the range set in advance and the front wheel rotating speed is lower than the rear wheel rotating speed, and in a case where rear wheel rotational acceleration, which is rotational acceleration of the rear wheel, is equal to or higher than first reference acceleration set in advance or where rotating speed of an engine of the vehicle is equal to or higher than first reference rotating speed set in advance, the vehicle speed grasping unit grasps the vehicle speed on the basis of the front wheel rotating speed, in the case where the difference between the front wheel rotating speed and the rear wheel rotating speed is out of the range set in advance and the front wheel rotating speed is lower than the rear wheel rotating speed, and in a case where the rear wheel rotational acceleration is lower than second reference acceleration set in advance and the front wheel rotating speed is lower than second reference rotating speed set in advance or where front wheel rotational acceleration, which is rotational acceleration of the front wheel, is minus and equal to or lower than third reference acceleration set in advance, the vehicle speed grasping unit grasps the vehicle speed on the basis of the rear wheel rotating speed, in the case where the difference between the front wheel rotating speed and the rear wheel rotating speed is out of the range set in advance and the front wheel rotating speed is lower than the rear wheel rotating speed, and in a case where the rear wheel rotational acceleration is lower than the first reference acceleration, the rotating speed of the engine of the vehicle is lower than the first reference rotating speed, the front wheel rotational acceleration is higher than the third reference acceleration, and the rear wheel rotational acceleration is equal to or higher than the second reference acceleration and the front wheel rotating speed is equal to or higher than the second reference rotating speed, the vehicle speed grasping unit grasps the vehicle speed with the normal method, in a case where the difference between the front wheel rotating speed and the rear wheel rotating speed is out of the range set in advance and the front wheel rotating speed is higher than the rear wheel rotating speed, and in a case where the rear wheel rotational acceleration is minus and equal to or lower than fourth reference acceleration set in advance or where the rotating speed of the engine of the vehicle is lower than third reference rotating speed set in advance, the vehicle speed grasping unit grasps the vehicle speed on the basis of the front wheel rotating speed, and in the case where the difference between the front wheel rotating speed and the rear wheel rotating speed is out of the range set in advance and the front wheel rotating speed is higher than the rear wheel rotating speed, and in a case where the rear wheel rotational acceleration is higher than the fourth reference acceleration and the rotating speed of the engine of the vehicle is equal to or higher than the third reference rotating speed, the vehicle speed grasping unit grasps the vehicle speed with the normal method;

wherein the first reference acceleration, the second reference acceleration, the third reference acceleration, the fourth reference acceleration, the first reference rotating speed, the second reference rotating speed, and the third reference rotating speed are based on a vehicle type of the vehicle.

* * * * *